United States Patent
James et al.

(10) Patent No.: US 10,694,343 B2
(45) Date of Patent: Jun. 23, 2020

(54) TRANSPARENT EVENT AND PRODUCT-BASED SOCIAL CAMPAIGN PARTICIPATION VIA SMS

(71) Applicant: Cheerity, Inc., Mohegan Lake, NY (US)

(72) Inventors: Jonathan James, Brooklyn, NY (US); Sean Adams, Brooklyn, NY (US); Edward Erenberg, Mohegan Lake, NY (US); Angela den Tex, Carmel, NY (US); Michael Fox, New Rochelle, NY (US)

(73) Assignee: Cheerity, Inc., Mohegan Lake, NY (US)

( * ) Notice: Subject to any disclaimer, the term of this patent is extended or adjusted under 35 U.S.C. 154(b) by 0 days.

(21) Appl. No.: 16/021,347

(22) Filed: Jun. 28, 2018

(65) Prior Publication Data
US 2020/0008020 A1    Jan. 2, 2020

(51) Int. Cl.
| | | |
|---|---|---|
| *H04W 4/14* | (2009.01) | |
| *H04L 29/08* | (2006.01) | |
| *H04L 29/06* | (2006.01) | |
| *G06F 21/62* | (2013.01) | |

(52) U.S. Cl.
CPC .......... *H04W 4/14* (2013.01); *G06F 21/6218* (2013.01); *H04L 63/0884* (2013.01); *H04L 67/02* (2013.01); *H04L 67/146* (2013.01)

(58) Field of Classification Search
CPC .... G06F 16/958; G06F 17/30; G06F 21/6218; G06Q 30/02; H04L 67/02; H04L 63/0884; H04L 67/146; H04L 67/306; H04L 67/1097; H04W 4/14
See application file for complete search history.

(56) References Cited

U.S. PATENT DOCUMENTS

| | | | |
|---|---|---|---|
| 2007/0027775 A1 | 2/2007 | Hwang | |
| 2008/0208867 A1* | 8/2008 | Poston | G06F 16/958 |
| 2009/0089131 A1* | 4/2009 | Moukas | G06Q 10/0631 |
| | | | 705/70 |
| 2010/0159894 A1 | 6/2010 | Rysenga et al. | |
| 2011/0251895 A1* | 10/2011 | Bladel | G06Q 30/02 |
| | | | 705/14.54 |
| 2015/0100483 A1 | 4/2015 | Schoenberg | |
| 2015/0156159 A1* | 6/2015 | Hanson | H04L 51/18 |
| | | | 709/204 |
| 2017/0070570 A1* | 3/2017 | Jalili | H04L 67/1097 |
| 2017/0104711 A1 | 4/2017 | Hanson et al. | |
| 2017/0185753 A1* | 6/2017 | Yang | G06F 21/10 |

* cited by examiner

*Primary Examiner* — Ernest G Tacsik
(74) *Attorney, Agent, or Firm* — Saile Ackerman LLC; Stephen B. Ackerman; Rosemary L. S. Pike (57) ABSTRACT

A method and system for authenticating ownership of uploaded content to a server by cellular messaging is described. Content is uploaded to a server by cellular messaging. If the user has a user account, the user account is retrieved. If not, a user account is created. A URL is created and mapped to the content and the user account and sent as a hyperlink by cellular messaging to the user. Upon a first activation of the hyperlink, the user is authenticated as an owner of the content. A cookie is embedded in the owner's device. Upon a subsequent activation of the hyperlink, if the cookie is detected in the user's device, the owner is allowed to access, edit, download, or share the content. If the cookie is not detected, the user is not an owner, so the user is only allowed to access and not edit the content.

17 Claims, 5 Drawing Sheets

TRANSPARENT EVENT AND PRODUCT-BASED SOCIAL CAMPAIGN PARTICIPATION VIA SMS

TECHNICAL FIELD

This application relates to the general field of uploading content to a server by cellular messaging, and more particularly, to methods of authenticating ownership of uploaded content to a server by cellular messaging.

BACKGROUND

Users who participate in charitable, entertainment, and sports events often want to share their participation on social media. Similarly, a retail product or offline promotion may contain a call to action for content, possibly in return for a donation, coupon, or offer from a brand or sponsor, and often as part of a social fundraising campaign. Entering a web URL (uniform resource locator) link on a mobile phone can be difficult and at events with large crowds, cellular internet may be weak or non-existent. Users also need a safe experience with a singular account, but creating a password for a temporary process is annoying and can decrease or prevent participation.

Several US patent applications show methods of sending a URL by SMS (short message service) message: 2017/0104711 (Hanson et al), 2007/0027775 (Hwang), 2015/0100483 (Schoenberg) and 2010/0159894 (Rysenga).

SUMMARY

It is an object of the present disclosure to provide a method and system to upload content by cellular messaging.

It is another object of the disclosure to provide a method and system for authenticating ownership of uploaded content by cellular messaging.

It is a further object of the disclosure to provide a method and a system to send a dual-purpose hyperlink for content to be uploaded by cellular messaging.

Yet another object of the present disclosure is to provide a method and a system to send a dual-purpose hyperlink to content to be uploaded to a server sent by cellular messaging wherein the hyperlink authenticates and logs in the owner of the content upon first access and keeps the owner logged in upon subsequent access and wherein the hyperlink allows non-owners to view, but not alter the content.

Yet another object is to provide a method and a system for dual-purpose uniform resource locators (URL) that double as an authenticator for privileged access to a resource and a non-authenticator for non-privileged access to a resource in a client/server environment.

In accordance with the objectives of the present disclosure, a method for authenticating ownership of uploaded content to a server by cellular messaging is achieved. The method comprises the following steps. Content uploaded by a user to a server by cellular messaging is received. If the user has a user account, the user account is retrieved. If the user does not have a user account, a user account is created for the user. A URL is created and mapped to the content and the user account. The URL is sent as a hyperlink by cellular messaging to the user. Upon a first activation of the hyperlink by the user, the user is authenticated as an owner of the content wherein the owner may access, edit, download, or share the content. A cookie is embedded in the owner's device. Upon a subsequent activation of the hyperlink by a user, if the cookie is detected in the user's device, the owner is allowed to access, edit, download, or share the content. If the cookie is not detected in the user's device, the user is not an owner, so the user is only allowed to access and not edit the content.

Also in accordance with the objectives of the present disclosure, a system for authenticating ownership of uploaded content to a server by cellular messaging is achieved. A communications platform is configured to receive content uploaded by a user to a server by cellular messaging. A user module is configured to retrieve a user account for the user or if the user does not have a user account, create a user account for the user. A link module is configured to create a media uniform resource locator (mURL) mapped to the content and the user account and to send the mURL as a hyperlink by cellular messaging to the user. An authenticator is configured to authenticate the user as an owner of the content upon receiving a first activation of the hyperlink by the user, wherein the owner may access, edit, download, or share the content and after authenticating the user, embedding a cookie in the owner's device. The authenticator further is configured to check for the presence of the cookie in the user's device upon receiving a subsequent activation of the hyperlink by a user, and, if the cookie is present, allowing the owner to access, edit, download, or share the content, and if the cookie is not present, the user is not an owner, so allowing the user to access but not edit the content.

Also, in accordance with the objectives of the present disclosure, a non-tangible computer readable storage medium having instructions that when executed by a processor cause the processor to perform operations is achieved. The operations comprise: 1) receiving content uploaded by a user to a server by cellular messaging, 2) retrieving a user account for the user or if the user does not have a user account, creating a user account for the user, 3) creating a media uniform resource locator (mURL) mapped to the content and the user account, 4) sending the mURL as a hyperlink by cellular messaging to the user, 5) upon receiving a first activation of the hyperlink by the user, authenticating the user as an owner of the content wherein the owner may access, edit, download, or share the content and embedding a cookie in the owner's device, and 6) upon receiving a subsequent activation of the hyperlink by a user, checking for the presence of the cookie in the user's device and, if present, allowing the owner to access, edit, download, or share the content, and if not present, the user is not an owner, so allowing the user to access but not edit the content.

Also, in accordance with the objectives of the present disclosure, a system for uploading content to a server by cellular messaging is achieved. The system comprises a memory and a processor coupled to the memory and configured to communicate with a plurality of campaign programs via a campaign service, the plurality of campaign programs configured to be viewable to a plurality of user devices via a user-facing application (APP). When content is uploaded by a user of one of the plurality of user devices via a wireless carrier to a communications platform in response to one of the plurality of campaign programs viewed on the APP, the communications platform starts up an event-driven campaign platform configured to 1) send the content and a user identification to the one of the plurality of campaign programs, wherein the campaign service sends the content to a media processing module for storage and to a posting module for posting on the APP wherein a media uniform resource locator (mURL) is generated for the posting, and wherein the APP sends the mURL as a hyperlink through the wireless carrier to the user identifying the user as an owner of the content and 2) authenticate access to the content wherein when the communications platform receives an activation of the hyperlink, the campaign service requests authentication from the link service wherein if the activation is a first time activation by an owner of the content, then the owner is authorized to access, edit, download, or share the content and authentication is turned off for the content, wherein if the activation is a subsequent activation by an owner of the content, then the owner is authorized to access, edit, download, or share the content, and wherein if the activation is by a non-owner of the content, the non-owner is authorized to access but not to edit the content.

Also, in accordance with the objectives of the present disclosure, a computer-implemented method for uploading content to a server by cellular messaging is achieved. A plurality of campaign programs on a campaign service is presented, by at least one processor, to a plurality of user devices via a user-facing application (APP). The processor receives content uploaded by a user of one of the plurality of user devices via a wireless carrier to a communications platform in response to one of the plurality of campaign programs viewed on the APP. In response to receiving the content, the processor starts up an event-driven campaign platform which sends the content and a user identification to the one of the plurality of campaign programs, wherein the campaign service sends the content to a media processing module for storage and to a posting module for posting on the APP wherein a media uniform resource locator (mURL) is generated for the posting, and wherein the APP sends the mURL as a hyperlink through the wireless carrier to the user identifying the user as an owner of the content. Authenticating access to the content is performed wherein when the communications platform receives an activation of the hyperlink, the campaign service requests authentication from the link service wherein if the activation is a first time activation by an owner of the content, then the owner is authorized to access, edit, download, or share the content and authentication is turned off for the content, wherein if the activation is a subsequent activation by an owner of the content, then the owner is authorized to access, edit, download, or share the content, and wherein if the activation is by a non-owner of the content, the non-owner is authorized to access but not to edit the content.

Also in accordance with the objectives of the present disclosure, a non-tangible computer readable storage medium having instructions that when executed by a processor cause the processor to perform operations is achieved. The operations comprise: 1) presenting a plurality of campaign programs on a campaign service to a plurality of user devices via a user-facing application (APP), 2) receiving content uploaded by a user of one of the plurality of user devices via a wireless carrier to a communications platform in response to one of the plurality of campaign programs viewed on the APP, 3) starting up an event-driven campaign platform in response to receiving the content, 4) sending the content and a user identification to the one of the plurality of campaign programs, wherein the campaign service sends the content to a media processing module for storage and to a posting module for posting on the APP wherein a media uniform resource locator (mURL) is generated for the posting, and wherein the APP sends the mURL as a hyperlink through the wireless carrier to the user identifying the user as an owner of the content; and, 5) authenticating access to the content wherein when the communications platform receives an activation of the hyperlink, the campaign service requests authentication from the link service wherein if the activation is a first time activation by an owner of the content, then the owner is authorized to access, edit, download, or share the content and authentication is turned off for the content, wherein if the activation is a subsequent activation by an owner of the content, then the owner is authorized to access, edit, download, or share the content, and wherein if the activation is by a non-owner of the content, the non-owner is authorized to access but not to edit the content.

BRIEF DESCRIPTION OF THE DRAWINGS

In the accompanying drawings forming a material part of this description, there is shown.

DETAILED DESCRIPTION

Figure 1:
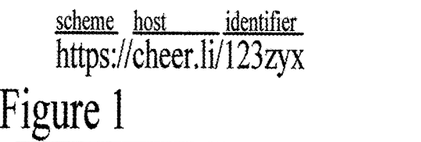
FIG. 1 illustrates an example of a URL used in a preferred embodiment of the present disclosure.

The present disclosure provides a method and a system for dual-purpose uniform resource locators (URL) that double as an authenticator for privileged access to a resource and a non-authenticator for non-privileged access to a resource in a client/server environment. The dual-purpose URL system of the present disclosure reduces the number of interactions needed for a designated resource owner to claim ownership of the resource and share the resource with non-owners without giving them ownership. The dual-purpose URL has a simplified format that makes it uniquely applicable for dual-purpose authentication and sharing, and this format maximizes compatibility with different delivery mechanisms (email and SMS, for example) and types of client systems where it is displayed and interacted with by end users. FIG. 1 shows a sample URL consisting of a scheme, a host, and an identifier. The scheme is the protocol identifier, such as https or http, the host is a registered hostname that functions as a short-form alias of the canonical hostname of the application, and the identifier is a universally unique identifier that is mapped to database data that contains state information about the link. The universally unique identifier is generated by an algorithm to be no more than 14 characters in length, for example.

Brands and charities can incentivize users to upload photo or video and text content to social networks and other platforms to create native content. This process can be accomplished on the web easily, but it is difficult at physical events and from other offline promotions. The system of the disclosure allows users to use Multimedia Message Service (MMS) to send their photo to a short code or 10-digit phone number, provided by digital or physical marketing materials. Upon receipt, the system provides a seamless process that is invisible to the user that:

1) Categorizes their content in the system.

Figure 7:
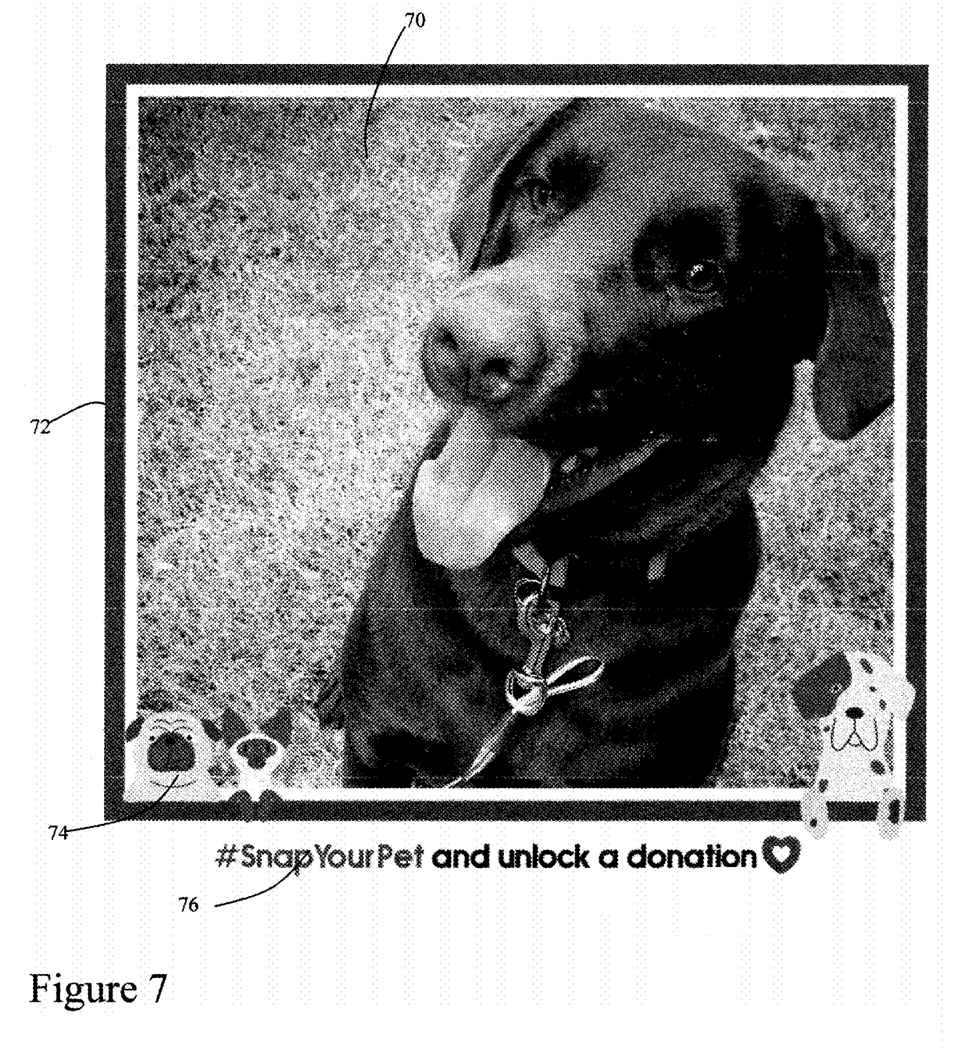
FIG. 7 is an example of a screen shot of a branded frame on an image in the process of the present disclosure.

2) Returns a single use login link to their photo that in most cases will have been overlaid with a branded frame. The branded frame is a digital image with some level of transparency in some parts that is composited with the original image to create an effect similar to a watermark. FIG. 7 shows an example of a user-provided photo 70. The branded frame 72 includes a border 74 and text 76, for example.

3) The first time the link is clicked, the user is authenticated and redirected to a website where the user can see, edit, download, or share the content.

4) If the user subsequently clicks the link, the user is redirected to the website without re-authentication.

5) The link can be set to expire when desired or at the close of a campaign.

Figure 2:
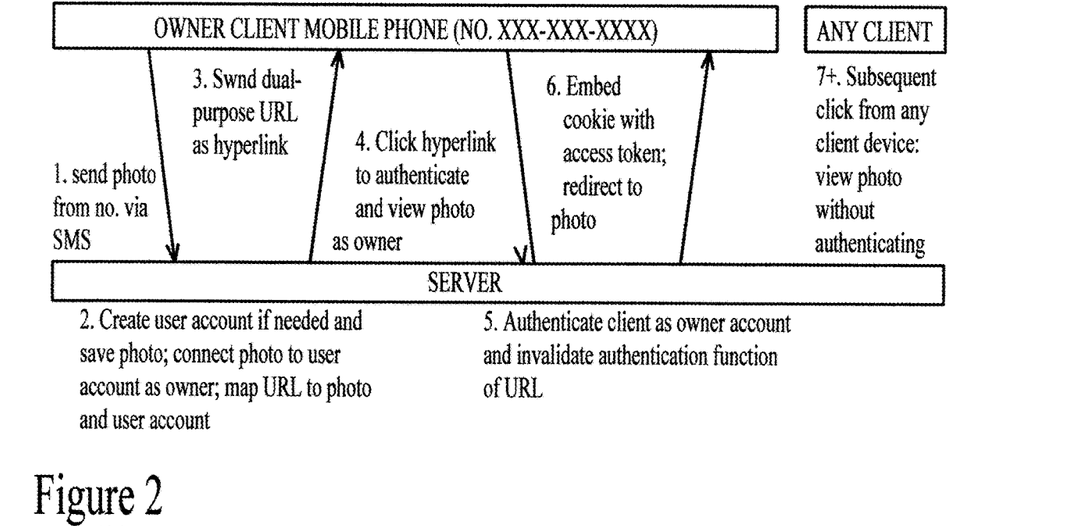
FIG. 2 is an illustration of a process flow of a preferred embodiment of the present disclosure.

The process is illustrated in FIG. 2. This process creates a simple user experience that is initiated by (1) using MMS to text a photo (resource) to a phone number or a short code that uses only 5 or 6 digits, preferably less than 6 digits. This is much easier than using a mobile device browser and typing in an internet URL address and subsequently uploading the content. (2) The platform on the server creates a user account if needed and saves the photo. The photo is connected to the user's account as the owner. Once the content is received and cataloged, the user needs to be directed easily to the website to edit and share it. The URL of the photo on the website is mapped to the photo and the user account.

(3) The system delivers the URL to the resource owner's client system via a digital transfer mechanism such as SMS (short message service), where it is displayed as a hyperlink. On most phones, the link will preview showing the photo, overlaid with a branded frame if applicable so the user sees the benefit of retrieving and sharing the content. It also returns a single link that automatically opens in a mobile browser and authenticates the user the first time. The link can continue to be used to revisit the content on the website without having to authenticate the user again or create a new link to the content. No password or account is visible to the user, but the user can be connected to his or her content safely. This allows for repeated use during the campaign and further reduces the possibility for the user to abandon the process while still protecting the user's experience.

(4) The first time the user interacts with the hyperlink, it acts as an authentication mechanism wherein (5) the user is authenticated by the platform as the owner of the photo and can view, edit, download, or share the photo. The system assumes that the first person to use the hyperlink is the owner because when the URL is delivered it includes language telling the user to use the link to claim ownership of the photo. When the user is authenticated, the platform (6) embeds a cookie with an access token into the user's client system, i.e. smartphone or other device, and then directs the client system to the resource. The system also invalidates the authentication function of the URL by updating the database record associated with the link's unique identifier. This allows the user to (7) subsequently access the photo without further authentication. Any subsequent visit to the URL causes the server system to skip the authentication step and only direct the client system to the designated resource. The access token in the user's client system provides evidence that this user can edit, share, etc. the photo.

Also, other clients' devices (7) may view the photo without having access to edit it. When a client system accesses a resource, the server system discerns between authenticated and unauthenticated access and can deliver a different experience for each when configured to do so. The owner of a photo may share the link with others in order for them to access it. A client may be any user, registered or not.

The completed process maximizes the potential for converting a physical attendee or the user of a product into a digital participant in an online social media campaign. This benefits the campaign sponsor by providing more users than would have been available by increasing users who follow the call to action and by reducing abandonment. The system also provides benefit for the user by providing the easiest and most enjoyable user experience with a higher level of satisfaction than current, inferior processes that require entering URL addresses, traditional account creation and password retrieval, and difficulty in uploading content.

Each dual-purpose URL contains a unique identifier that is mapped by the server system to both a user account and a resource. FIG. 1 shows a sample URL consisting of a scheme, a host, and an identifier. The scheme is the protocol identifier, such as https or http, the host is a shortened variant of the canonical URL, and the identifier is a universally unique identifier that is mapped to database data that contains state information about the link. The universally unique identifier is generated by an algorithm to be no more than 14 characters in length, for example.

At the time the server system generates a dual-purpose URL, a resource (photo or video) must exist to be associated with the URL; however, a user account may be generated on the fly if the server system is given a mobile phone number or another unique identifier that can be mapped to a single user account and serve as a delivery destination for the URL. The server system is capable of creating user accounts connected to resources if they do not already exist, which uniquely allows the server system to receive incoming MMS messages from mobile devices containing a resource and return a dual-purpose URL without requiring a pre-existing user account.

Figure 3:
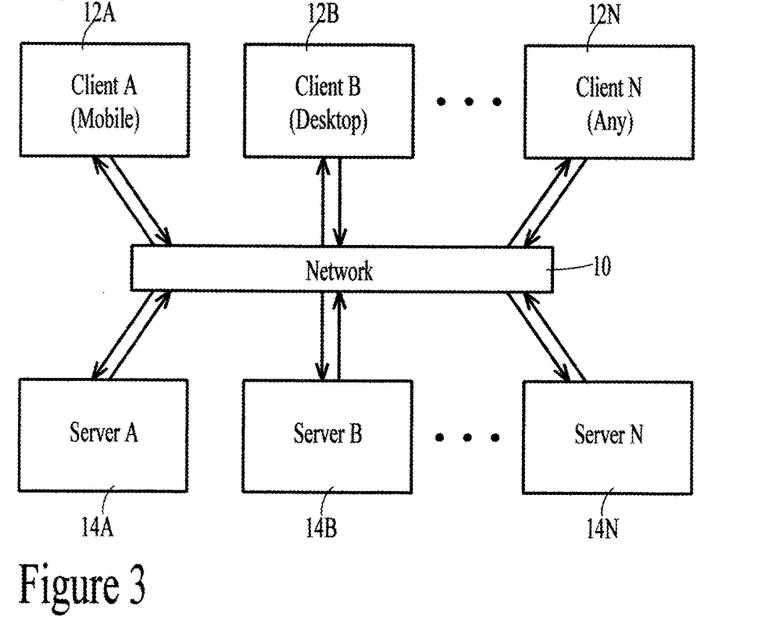
FIG. 3 is a block diagram depicting an embodiment of a network environment comprising local devices in communication with remote devices according to the present disclosure.

FIG. 3 is a block diagram illustrating local devices in communication with remote devices. Client devices 12A, 12B, . . . , 12N may be mobile devices such as smart phones, tablets, or computers such as desktop or laptop devices, or any device capable of storing photo or video content. The devices 12A-12N are capable of two-way communication with network 10. Servers 14A, 14B, . . . 14N, also capable of two-way communication with the network 10, may be any type of server or gateway or firewall, remote machine, or node. Network 10 may be a public network or a private network, clients and servers may be on the same network, or there may be multiple networks between the clients and servers.

Communication between the network and servers and the network and clients may be through wired or wireless links. Importantly, wireless communication between the clients and the network may be through cellular network connections.

Figure 4A:
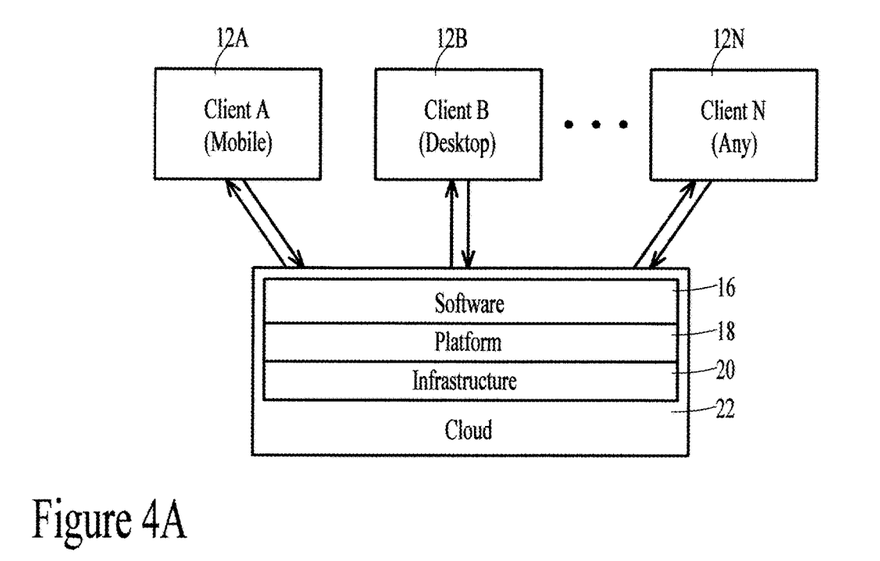
FIGS. 4A and B are block diagrams depicting embodiments of computers useful in connection with the methods and systems according to the present disclosure.

FIG. 4A illustrates a cloud-based computing environment where client devices 12A, 12B, . . . 12N are in communication with cloud 22 over one or more networks. The cloud 22 may be a public, private, or hybrid cloud. The cloud may include infrastructure 20 providing networks 10, servers (14A, . . . 14N), and storage, a platform 18 servicing the functionality of the infrastructure, and software 16 implementing the services.

Figure 4B:
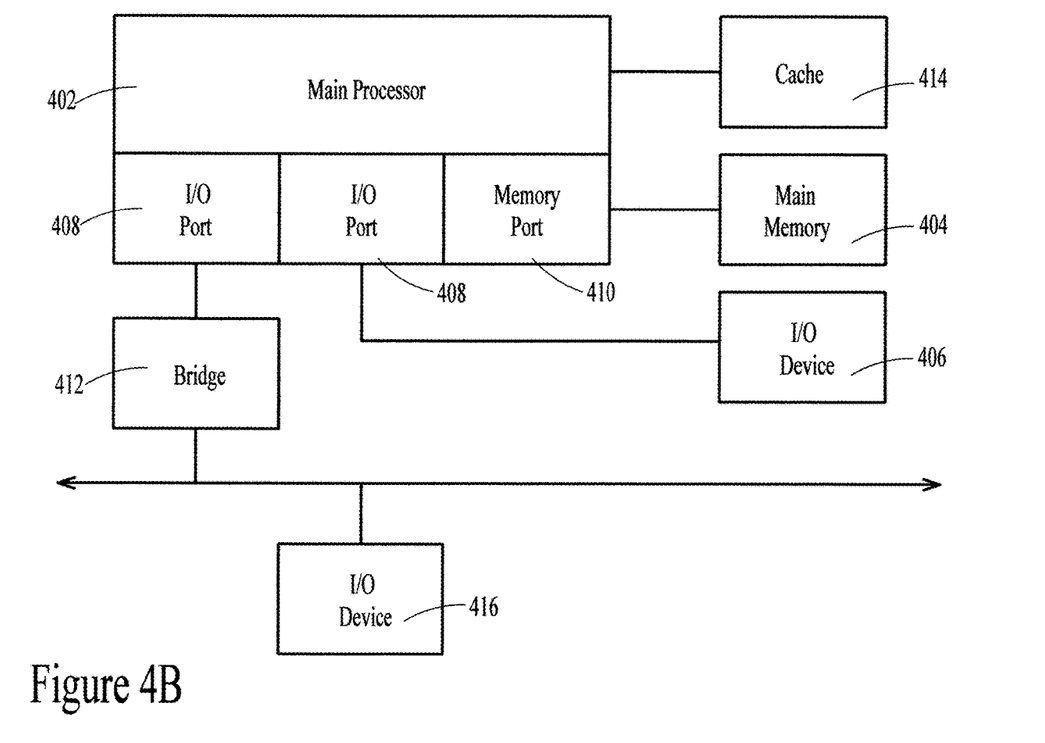

The client 12A, . . . 12N and server 14A, . . . 14N may be resident and/or executed on any type of computing device that can communicate on any type of network and can perform the operations herein described. FIG. 4B provides a block diagram of a computing device that can practice an embodiment of the client 12A, . . . 12N or server 14A, . . . 14N.

Referring now more particularly to FIG. 4B, the computing device may include a central processing unit (CPU) 402, a main memory 404, input/output devices 406, input/output ports 408, a memory port 410, a bridge 412, input/output devices 416, and a cache memory 414 in communication with the central processing unit 402. The central processing unit 402 is any logic circuitry that responds to and processes instructions received from the main memory 404. The main memory 404 may include one or more memory chips capable of storing data and allowing any storage location to be directly accessed by the main processor 402.

It will be understood that any of the client devices 12A, . . . 12N, such as cellular devices, may have the hardware configuration depicted in FIG. 4B. Furthermore, any other computing device including a server 14A, . . . 14N may have the hardware configuration depicted in FIG. 4B. For example, if FIG. 4B represents a server, the dual purpose link and content ingestion engine of the present disclosure may be executed by the operating system and loaded into main memory 404; the software accesses the I/O device 416 using the software interface provided by the operating system.

Figure 5:
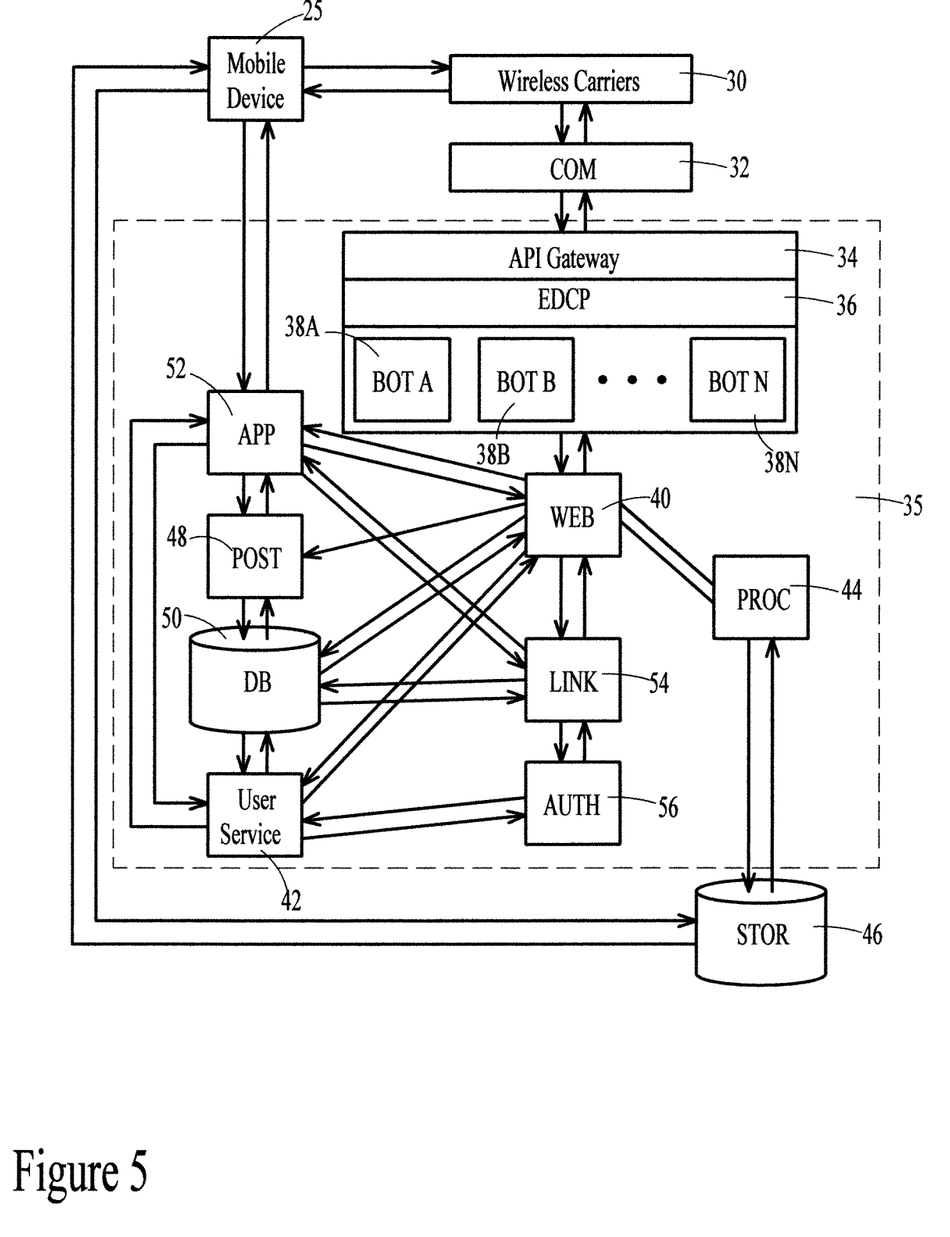
FIG. 5 is a block diagram depicting an environment comprising a communication technology platform useful in connection with the methods and systems according to the present disclosure.

The dual-purpose link and content ingestion engine of the present disclosure may be used with any publishing platform. FIG. 5 illustrates the components of the system in more detail. These include Wireless Carriers 30 and Communications Platform 32. Wireless carriers include all possible wireless service telephone and/or data providers. Communications platform (COM) 32 may be a third-party platform or a proprietary and non-third party platform. The dual-purpose link and content ingestion engine 35 is an instance of software 16 in FIG. 4A running on virtualized operating systems and other platform software 18. Some of the platform software such as 34, 36, and 46 in FIG. 5 run as services offered by Amazon Web Services™ (an Amazon company) or other cloud service providers, which in the real world exist as AWS API Gateway™, AWS Lambda™, and AWS S3™, respectively. The dual-purpose link and content ingestion engine 35 software and the platform software 18 run on hardware in data centers which is 20. Collectively, this all exists as 22. Some instances of platform software could be running parts of software 35 on the same machine, but some instances of platform software could be running on different machines.

BOTs 38 are the "cloud functions" that are run in any major cloud platform, such as Google Cloud Platform™ (a cloud platform offered by Google company) or Amazon Web Services™ (AWS), for example. BOTs 38 use the COM 32 to communicate with mobile devices 25.

The Communications Platform (COM) is platform software that spins up a web server and runs a BOT 38 whenever an MMS comes in. COM will allow choosing and registering phone numbers and short codes for use on its platform. For a registered phone number or short code, the platform will allow forwarding incoming SMS and MMS (multimedia messaging service) data to a custom URL as an HTTP (hypertext transfer protocol) request. The platform 32 also allows sending SMS and MMS messages to any mobile number from a registered phone number via an HTTP Application Programming Interface (API), as the platform is integrated with mobile carriers such as Verizon Wireless™. The phone number is a virtual number registered with the communications platform's Voice over Internet Protocol (VoIP) system and message sending is enabled via a Common Channel Signaling System No. 7 (SS7) VoIP gateway, for example. Files are saved from incoming and outgoing MMS messages and URLs for downloading are provided.

An event-driven compute platform 36 may comprise a plurality of campaign-specific SMS/MMS Bots (BOT) 38a, 38b, 38n, where a campaign is, for example, a fundraising campaign. When COM 32 receives an inbound MMS message, it sends a request to the API gateway 34 which is the HTTP front end to the event-driven compute platform (EDCP) 36. The EDCP 36 includes "cloud functions" which are code procedures that "live" in the cloud and are run when they are called. The API gateway 34 calls a cloud function in the EDCP 36 when it receives an inbound request from COM 32. Each campaign has its own instance of 34 and 36. The campaign-specific cloud function is what connects the inbound data from COM to a specific campaign (BOT), and it adds this campaign ID to the data when it sends requests to WEB 40.

Each one of the BOTs 38a-38n receives MMS messages and sends SMS responses to the senders of the MMS messages. A user sends a photo or video with optional text from a mobile device 25 over a wireless carrier network 30. The communications platform (COM) 32 receives the MMS content over its VoIP infrastructure and stores any media on its own storage mechanism. COM then sends an HTTP request to API 34 with data about the message including a link to access the media in its own storage.

The API gateway 34 launches a compute instance to handle the request. The Event-Driven Compute Platform (EDCP) 36 runs on demand for a few seconds at a time in response to incoming HTTP requests from the API gateway. The EDCP is powered by virtualization software. The cloud platform that offers EDCP only charges for the time the "cloud functions" are running and charges in 100 ms increments. When "cloud functions" are not being run, they lie dormant in the system and there is no charge for their downtime. Thus, the EDCP is inexpensive. The EDCP is also highly scalable because the virtualization software can scale the "cloud functions" to cloud scale, running them concurrently across a huge number of machines if needed.

The EDCP 36 combines data from the incoming MMS message with hardcoded data relating to the current campaign (one of the BOTs 38a-38n) to create a final payload (PAYLOAD) that it forwards to the Campaign Web Service (WEB) 40. At a minimum, the PAYLOAD contains 1) the unique ID of the campaign (CID), 2) the URL of the media file from the MMS that was saved by the COM, 3) the mimetype (or mediatype) of the media file from the MMS (MIME), and 4) the phone number of the device that sent the MMS (PHONE).

The WEB 40 receives the PAYLOAD from the BOT. The WEB retrieves the full data of the campaign matching the CID in the PAYLOAD. It validates the MIME and ensures that the file type is supported by the campaign. It requests a user associated with PHONE from the User Service (USER) 42. If the PHONE is not in the system, USER creates a new user associated with the PHONE. At the end of this procedure, the WEB receives the unique ID of the user (UID).

Next, the WEB compiles data that will be used to create a new post within this campaign (PDATA). This data includes: 1) Adding the CID to the data field representing the post's campaign, 2) Adding the UID to the data field representing the post's owner/author, 3) Passing the MURL to the Media Processing Service (PROC) 44 which downloads and processes the file, saves it to the Cloud File Storage (STOR) 46, and returns the URL of the saved file, and 4) Receiving the processed media URL from PROC and adding it to PDATA. In step 3, the WEB could be configured to delegate processing to PROC without waiting for the return URL by sending a pre-established resource location to PROC. In this case, WEB will then retrieve the URL from the pre-established resource location. WEB will then create a new post by sending PDATA to the Post Service (POST) 48.

The Media Processing Service (PROC) 44 receives a request containing: 1) a URL or a multipart file transfer for an image or video file, and 2) processing parameters. If provided with a URL, the service downloads the file from COM's storage using the URL and then sends a request to COM to delete the media on its storage. If provided with a multipart file transfer request, PROC downloads and saves the incoming file data. PROC saves the file on its local system storage in a temporary folder. It then processes it and sends the processed file and the unprocessed file as well to STOR 46.

The download results in a local file (PFILE). The PROC processes and/or converts the PFILE according to the received processing parameters. Parameters may include dimensions, quality level, the URL of a branded frame or watermark to apply to the image or video, the resulting file format, and other related parameters. If a branded frame or watermark URL is supplied in the processing parameters, the branded frame or watermark is cached for future use as a performance optimization.

The Cloud File Storage (STOR) 46 provides cloud file storage via a web services interface. Files can be uploaded via HTTP multipart transfer and accessed via a URL that is returned in the response to the HTTP multipart transfer request.

The Post Web Service (POST) 48 creates, retrieves, and updates posts in database (DB) 50. The posts are owned by users. Each post is associated with one campaign. Campaigns and posts are viewed in a graphical user interface (GUI) when using the user-facing Application (APP) 52.

The Dual-Purpose Link Web Service (LINK) 54 creates mobile-friendly, dual-purpose links that serve to authenticate and redirect to a resource on first use and only redirect to a resource on the second and subsequent uses. LINK receives an HTTP POST request from WEB 40 to create a dual-purpose link pointing to a resource. The request contains the unique ID of the user that owns the resource (UID) and the URL where the resource can be accessed. This URL does not point to the actual location where the file is stored, but rather it points to a page on a website where the file can be viewed by the public and managed by its owner.

LINK returns to WEB a compiled link (for example, as shown in FIG. 1) following a simplified format optimized for SMS. LINK creates and updates data relating to links in DB 50. Each link has an associated database entry where the state is tracked, the state being whether or not the link has been visited before and the redirect URL.

LINK Interfaces with the User Authentication Service (AUTH) 56 to retrieve a token to log a visitor in as a user of APP 52 on the first use of a dual-purpose link. LINK sends the token to the visitor's device in a secure cookie via APP 52. If an HTTP GET request is received with a user agent (the user agent is a string identifying the browser and operating system of the visitor that is sent along with the HTTP request in the HTTP headers) that matches that of an SMS URL preview generator, the request skips the authentication step and redirects the request to the full destination URL. In smart phones, e.g. iPhones® (smart phones manufactured and sold by Apple, Inc.), message threads will load a preview of a link before the recipient of the message has a chance to click it. It is important to detect this initial request and not mistake it for a real user clicking the link. If this were not detected, the cookie would accidentally be set on, for example, iMessage's headless browser (iMessage® is an instant messaging service developed by Apple, Inc.) and would not be set for the user in their native browser (Mobile Safari®, Internet browser software developed by Apple, Inc.).

The User Authentication Service (AUTH) 56 receives a UID from LINK and returns a token that can be used to authenticate a user's HTTP requests to APP 52. AUTH interfaces with USER 42 to manage access control and maintain a whitelist of active token IDs. That is, each token has a unique ID; the database record for a user contains a list of allowed token IDs, the whitelist. This database record is managed by USER. When a user logs out of the system, the token ID they were using to access the system is removed from the list of allowed token IDs. If a user chooses to log themselves out of all their devices, USER removes every ID from the list.

The User Web Service (USER) 42 creates, retrieves, and updates users in the DB 50. Users are uniquely indexed based on their mobile phone. The Database (DB) 50 stores user information.

The User-Facing Application (APP) 52 displays campaigns and posts to visiting clients. APP provides a GUI (graphical user interface) for browsing campaigns and posts. Clients possessing a token obtained from AUTH can manage posts they own via the provided GUI. Anyone may view any of the posts.

Figure 6:
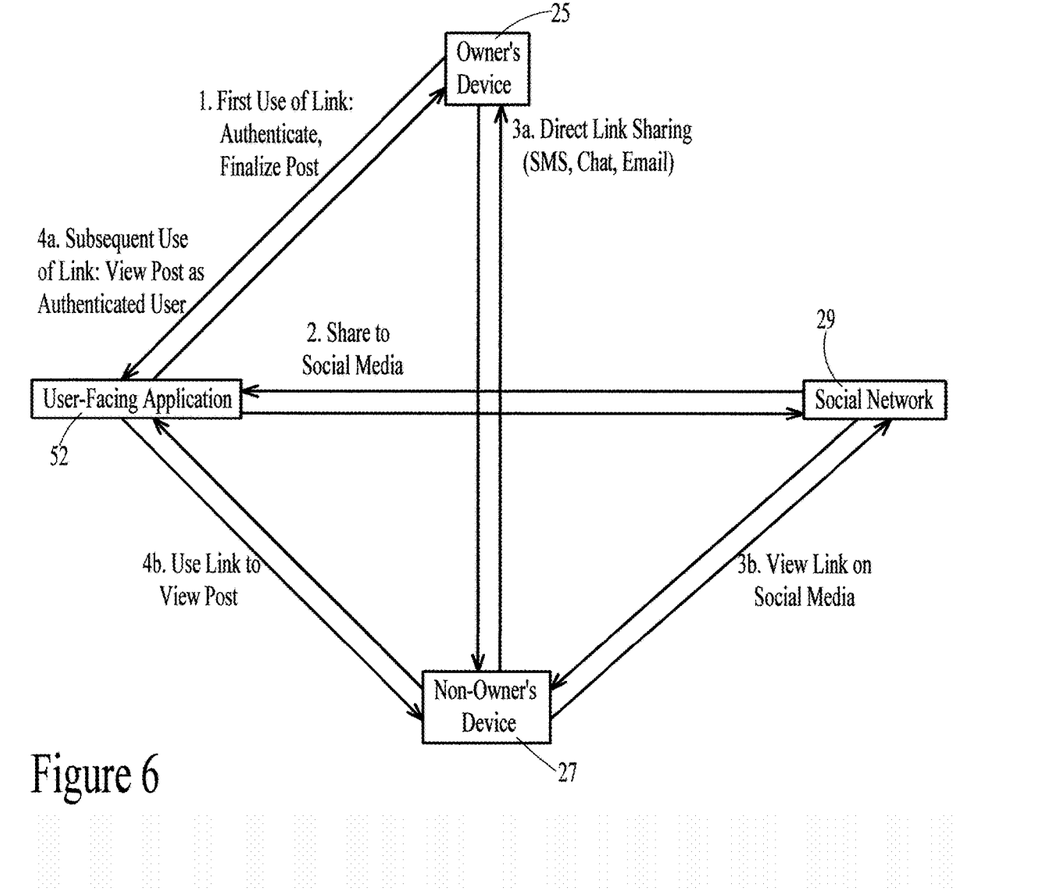
FIG. 6 is a block diagram depicting the flow of use for the dual-purpose link in a preferred embodiment of the present disclosure.

FIG. 6 illustrates the system of the present disclosure from the point of view of users. The owner of a photo or video sends the photo or video resource to a phone number or short code of a campaign service, receiving a hyperlink to a URL in response. The owner then clicks the hyperlink on his or her device 25. The first time the link is accessed (1), the User-Facing Application (APP) 52 authenticates the user and allows viewing, editing, downloading, or sharing the resource. APP 52 posts (2) the resource on a social network 29 associated with the campaign. The user 25 may share (3*a*) the hyperlink by SMS to another mobile device 27, or by chat or email, or other method. APP supports sharing to the major social networks but once the user has the hyperlink they can share it anywhere on the Internet including to any social network.

Whenever the owner 25 accesses the hyperlink after the first access (4*a*), the authentication step is skipped since APP recognizes the user as the owner of the content. The owner can view, edit, download, or share his or her own content at any time. Non-owner's devices 27 may view the resource (4*b*) by using the hyperlink to the APP 52 as a non-authenticated user or may view the content (3*b*) on social media 29. Non-authenticated users may view the resource, but may not edit it. They may download the resource or share the link to the resource via their web browser's functionality, but APP does not offer them a download or share option in its GUI.

The system and method of the present disclosure allow native posting to social media by allowing a user to connect their social media accounts and post via the social media APIs. Some social networks allow third-party software to operate on behalf of a user programmatically via a HTTP API. The user grants the third-party software permission to do this by logging into the social network account from within the third-party software using OAUTH and granting permissions. Once the user grants the third-party software permission, the software can then perform actions as if it were the user. This allows APP to post to social media as a native post, which is equivalent to the user making a post directly on the social network. This allows a seamless sharing experience where users can make use of social network functionality such as tagging friends and writing a custom message without needing to leave APP.

Although the preferred embodiment of the present disclosure has been illustrated, and that form has been described in detail, it will be readily understood by those skilled in the art that various modifications may be made therein without departing from the spirit of the disclosure or from the scope of the appended claims.

What is claimed is:

1. A method for automatically authenticating ownership of uploaded content to a server by cellular messaging comprising:
    receiving content uploaded by a user to a server by Multimedia Message Service (MMS) cellular messaging;
    retrieving a user account for said user or if said user does not have a user account, creating a user account for said user without interaction from said user;
    creating a post mapped to said content and said user account, establishing said user account as owner of said content;
    creating a media uniform resource locator (mURL) mapped to said post;
    sending said mURL as a hyperlink by Short Message Service (SMS) cellular messaging to said user;
    upon receiving a first activation of said hyperlink by said user, automatically authenticating said user as said owner of said post and therefore of said content and embedding a cookie in said user's device that associates said device with said user account; and
    upon receiving a subsequent activation of said hyperlink by a subsequent user, checking for the presence of said cookie in said subsequent user's device and, if detected, allowing said subsequent user now identified as said owner to access, edit, download, or share said content, and if not detected, identifying said subsequent user as a non-owner allowing said non-owner to access, download, or share, but not edit, said content.

2. The method according to claim 1 wherein said content comprises a media file comprising a digital image or a video.

3. The method according to claim 1 wherein said mURL comprises a scheme, a host, and an identifier wherein said scheme comprises a protocol identifier, said host is a shortened variant of a canonical URL, and said identifier is a universally unique identifier that is mapped to database data that contains state information about said hyperlink.

4. The method according to claim 3 wherein said universally unique identifier is generated by an algorithm to be no more than 14 characters in length.

5. The method according to claim 1 wherein said hyperlink is set to expire at the close of a campaign.

6. The method according to claim 1 wherein said content is uploaded to a phone number or a short code that uses <=6 digits.

7. The method according to claim 2 wherein a branded frame is composited with said digital photo or video.

8. A system for authenticating ownership of uploaded content to a server by cellular messaging comprising:
    a communications platform configured to receive content uploaded by a user to a server by Multimedia Message Service (MMS) cellular messaging;
    a user module configured to retrieve a user account for said user or if said user does not have a user account, to create a user account for said user without interaction from said user, and to create a post mapped to said content and said user account, establishing said user account as owner of said content;
    a link module configured to create a media uniform resource locator (mURL) mapped to said post and to send said mURL as a hyperlink by Short Message Service (SMS) cellular messaging to said user; and
    an authenticator configured to authenticate said user as said owner of said post and therefore of said content upon receiving a first activation of said hyperlink by said user, and embedding a cookie in said user's device that associates said device with said user account;
    said authenticator further configured to check for the presence of said cookie in a subsequent user's device upon receiving a subsequent activation of said hyperlink by said subsequent user, and, if said cookie is detected, allowing said subsequent user now identified as said owner to access, edit, download, or share said content, and if said cookie is not detected, identifying said subsequent user as a non-owner allowing said non-owner to access, download, or share, but not edit, said content.

9. The system according to claim 8 wherein said content comprises a media file comprising a digital image or a video.

10. The system according to claim 8 wherein said mURL comprises a scheme, a host, and an identifier wherein said scheme comprises a protocol identifier, said host is a shortened variant of a canonical URL, and said identifier is a universally unique identifier that is mapped to database data that contains state information about said hyperlink.

11. The system according to claim 10 wherein said universally unique identifier is generated by an algorithm to be no more than 14 characters in length.

12. The system according to claim 8 wherein said hyperlink is set to expire at the close of a campaign.

13. The system according to claim 8 wherein said content is uploaded to a phone number or a short code that uses <=6 digits.

14. The system according to claim 9 wherein a branded frame is composited with said digital photo or video.

15. A non-tangible computer readable storage medium having instructions that when executed by a processor cause said processor to perform operations comprising:
    receiving content uploaded by a user to a server by Multimedia Message Service (MMS) cellular messaging;
    retrieving a user account for said user or if said user does not have a user account, automatically creating a user account for said user without interaction from said user;
    creating a post mapped to said content and said user account, establishing said user account as owner of said content;
    creating a media uniform resource locator (mURL) mapped to said post;
    sending said mURL as a hyperlink by Short Message Service (SMS) cellular messaging to said user;
    upon receiving a first activation of said hyperlink by said user, automatically authenticating said user as said owner of said post and therefore of said content by embedding a cookie in said user's device that associates said device with said user account; and upon receiving a subsequent activation of said hyperlink by a subsequent user, checking for the presence of said cookie in said subsequent user's device and, if detected, allowing said subsequent user now identified as said owner to access, edit, download, or share said content, and if not detected, identifying said subsequent user as a non-owner allowing said non-owner to access, download, or share, but not edit, said content.

16. The non-tangible computer readable storage medium according to claim 15 wherein said content comprises a media file comprising a digital image or a video.

17. The non-tangible computer readable storage medium according to claim 16 wherein a branded frame is composited with said digital photo or video.

\* \* \* \* \*